United States Patent
Trinh

(10) Patent No.: US 10,178,288 B2
(45) Date of Patent: Jan. 8, 2019

(54) MONITORING SYSTEM FOR A MOTOR VEHICLE, PLUG-ON MODULE

(71) Applicant: Robert Bosch GmbH, Stuttgart (DE)

(72) Inventor: Hoang Trinh, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 359 days.

(21) Appl. No.: 14/825,937

(22) Filed: Aug. 13, 2015

(65) Prior Publication Data

US 2016/0057324 A1 Feb. 25, 2016

(30) Foreign Application Priority Data

Aug. 21, 2014 (DE) .................. 10 2014 216 645

(51) Int. Cl.
| | |
|---|---|
| *H04N 5/225* | (2006.01) |
| *G06K 9/00* | (2006.01) |
| *G06K 9/20* | (2006.01) |
| *H04N 5/33* | (2006.01) |
| *H04N 7/18* | (2006.01) |

(52) U.S. Cl.
CPC ....... *H04N 5/2256* (2013.01); *G06K 9/00335* (2013.01); *G06K 9/00362* (2013.01); *G06K 9/00845* (2013.01); *G06K 9/2027* (2013.01); *H04N 5/2251* (2013.01); *H04N 5/2252* (2013.01); *H04N 5/2254* (2013.01); *H04N 5/33* (2013.01); *H04N 5/332* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 9,819,815 B1* | 11/2017 | Babu ................. | H04N 1/00129 |
| 2007/0013779 A1* | 1/2007 | Gin .................. | G08B 13/19626 348/159 |
| 2007/0165408 A1* | 7/2007 | Li ..................... | F21K 9/00 362/294 |
| 2007/0171625 A1* | 7/2007 | Glazner ............. | F21S 8/035 362/95 |
| 2008/0218601 A1* | 9/2008 | Suemoto ........... | H04N 1/00167 348/231.99 |
| 2011/0001872 A1* | 1/2011 | Honsho ............. | G02B 7/102 348/362 |
| 2012/0008923 A1* | 1/2012 | Kasai ................ | G11B 27/034 386/343 |
| 2012/0013729 A1* | 1/2012 | Barringer .......... | G03B 17/02 348/82 |
| 2012/0170300 A1* | 7/2012 | Kathmann .......... | F21S 41/192 362/543 |
| 2013/0118339 A1* | 5/2013 | Lee .................... | G10H 1/32 84/725 |

(Continued)

*Primary Examiner* — Edemio Navas, Jr.
(74) *Attorney, Agent, or Firm* — Norton Rose Fulbright US LLP; Gerard Messina

(57) ABSTRACT

A driver monitoring system for a motor vehicle has: at least one camera device including a cylindrical lens holder having at least one lens; at least one lighting element configured as an infrared radiator, and at least one plug-on module having a plate-shaped bearer on which the at least one lighting element is situated, the at least one plug-on module being configured to be plugged onto the lens holder.

15 Claims, 2 Drawing Sheets

(56) References Cited

U.S. PATENT DOCUMENTS

2015/0237238 A1* 8/2015 Duffy .................. H04N 5/2251
348/375
2015/0324635 A1* 11/2015 Tanaka .................... G06F 3/041
348/150

* cited by examiner

MONITORING SYSTEM FOR A MOTOR VEHICLE, PLUG-ON MODULE

BACKGROUND OF THE INVENTION

1. Field of the Invention

The present invention relates to a driver monitoring system for a motor vehicle, having at least one camera device including a cylindrical lens holder having at least one lens, and having at least one lighting element. In addition, the present invention relates to a plug-on module for such a monitoring system.

2. Description of the Related Art

Monitoring systems, in particular driver monitoring systems, are known from the existing art. In order to acquire the driver behavior, in order for example to determine whether the driver is paying attention to the traffic situation or is showing signs of fatigue, camera-based driver monitoring systems are known that acquire the face of the driver and, as a function of the acquired facial features, or the orientation of the driver's head, make inferences concerning the driver's behavior. Correspondingly, such monitoring systems have one or more camera devices that are oriented toward the driver's head position. In order to be able to monitor the driver even when the vehicle passenger compartment is dark, for example during travel at night, it is moreover known to provide one or more lighting means, in particular infrared radiators, that radiate toward the driver so that the camera device can acquire the driver in dark conditions as well, in particular without blinding the driver.

As a rule, the camera device has a camera chip or sensor having an objective made up of a lens holder and at least one lens. The variability of such camera devices known from the existing art is limited. In particular with regard to the number and configuration of lighting means, up to now corresponding constructive measures have been required that have to be taken into account during planning and development in order to modify the number and position of the lighting means, or to adapt them to a particular case of application.

BRIEF SUMMARY OF THE INVENTION

The monitoring system according to the present invention has the advantage that the camera device can easily be supplemented at low cost with one or more lighting means, in particular infrared radiators. Due to an advantageous modular design of the monitoring system, the camera device can be connected to different infrared radiators configured in different ways. According to the present invention, for this purpose it is provided that at least one plug-on module is provided that has a plate-type bearer on which the at least one infrared radiator is situated, and that is plugged onto, or is capable of being plugged onto, the lens holder. Thus, it is provided that the infrared radiator, or lighting means, is fastened directly on the lens holder by the bearer. The lens holder, which as a rule is already provided anyway in camera devices, thus at the same time acts as a mount for one or more infrared radiators. Thus, for example a plurality of infrared radiators can be situated on the bearer. Due to the fact that the bearer can be plugged onto the lens holder, the infrared radiators can thus easily be situated on the camera device, and in particular on the lens holder. Thus, during installation, through the use of different, or differently realized, plug-on modules, for example having a different number of infrared radiators, the monitoring system can be adapted to the respective case of application. Preferably, the bearer is fashioned as a circuit board, the circuit board having in particular a plurality of printed conductors for electrical contacting of the infrared radiator.

Particularly preferably, the circuit board has at least one contact means for the electrical contacting of the camera device.

According to an advantageous development of the present invention, it is provided that the bearer has at least one opening for accepting the lens holder. In this way, the lens holder can easily be plugged into the bearer, and in this way the bearer can be fastened on or to the lens holder.

Preferably, it is provided that the opening has a cross-section that corresponds at least substantially to the cross-section of the lens holder, in particular in at least one axial segment of the lens holder. In this way, a secure seating contact of the bearer on the lens holder is ensured. In particular, it is provided that the cross-sections are circular in shape. Alternatively, it is advantageous if the cross-sections of the lens holder and of the bearer have a shape differing from a circle, because in this way moreover a rotational securing is fashioned, ensuring the orientation of the bearer and thus of the plug-on module and of the at least one lighting means situated thereon. Alternatively, it is preferably provided that the opening has a diameter that is smaller than an outer diameter of the lens holder in at least one further axial segment of the lens holder. If the lens holder and the opening each have a circular cross-section, it is thereby achieved that the bearer can be pushed onto the lens holder only up to a particular axial segment. In this way, the axial position of the lighting means relative to the camera device can also be defined easily.

In addition, it is further provided that the lens holder has a jacket outer surface that is at least substantially conical. In this way, the diameter of the lens holder constantly increases, or decreases, in a direction. In particular, it is provided that the diameter of the lens holder increases in the direction of the camera chip, so that the bearer can easily be pushed onto the lens holder until it reaches the segment whose diameter is greater than the diameter of the opening. Here, the conical shape acts in particular as an aid to plugging on and to centering.

In addition, it is preferably provided that the lens holder and/or the bearer have means for orienting the bearer relative to the lens holder. These means can, as mentioned above, each have a cross-section that has a contour differing from a circular shape. Through such a polygonal shape of the cross-sections, an unambiguous orientation of the bearer on the lens holder can also be achieved, and in particular can produce a securing against rotation.

Preferably, the means have at least one guide groove and at least one guide pin that stands in effective connection with, or can be brought into effective connection with, the guide groove. The guide groove can be fashioned on the lens holder or on the bearer, and the guide pin is provided correspondingly on the bearer or on the lens holder. When the bearer is plugged onto the lens holder, the guide pin has to be brought into the guide groove in order to enable the pushing on. In this way, a specifiable orientation, in the sense of an angular position, of the bearer relative to the lens holder, and a rotational securing, are achieved.

According to an advantageous development of the present invention, it is provided that on the bearer there is provided at least one plug connector for the electrical contacting of the camera device. The plug connector can in particular contact the at least one infrared radiator, and to this extent can be controlled by the camera device. Usefully, the camera device has a corresponding connecting plug that can be brought into effective connection with the connecting plug of the bearer. In particular, the connecting plugs are configured such that when the bearer is plugged onto the lens holder they are automatically brought together in the orientation specified by the means.

According to a preferred development of the present invention, it is moreover provided that at least one cooling element, acting in particular to cool the lighting means or infrared radiators, is situated on the bearer. The cooling element can for example be a copper element, in particular a copper plate, or some other metallic cooling element.

The plug-on module according to the present invention for a monitoring system, having at least one camera device that has a lens holder having at least one lens, is distinguished in that it has a plate-shaped bearer on which there is situated at least one lighting means, in particular infrared radiator, and which can be plugged onto the lens holder. In this way, the above-named advantages for the variability of the monitoring system result.

In the following, the present invention is explained in more detail on the basis of an exemplary embodiment.

DETAILED DESCRIPTION OF THE INVENTION

Figure 1:
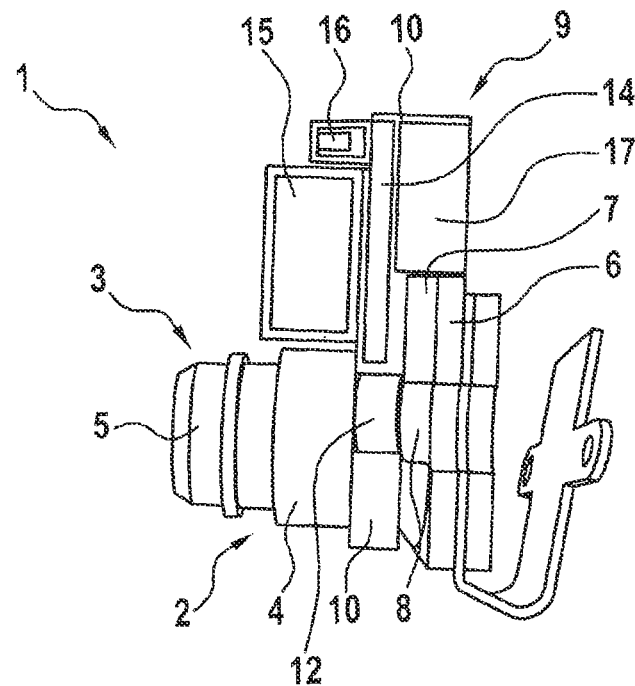
FIG. 1 shows a driver monitoring system in a simplified side view.

FIG. 1 shows, in a simplified side view, a driver monitoring system 1 for a motor vehicle. Driver monitoring system 1 has a camera device 2.

Figure 2:
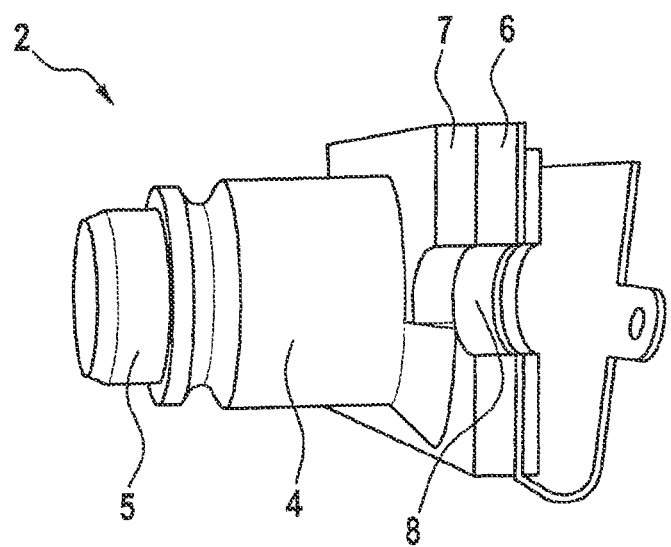
FIG. 2 shows a camera device of the monitoring system in a perspective view.

Camera device 2, shown in FIG. 2 in a perspective side view, has a camera sensor (not shown here in more detail) to which an objective 3 is allocated. Objective 3 has a lens holder 4 and a lens 5 held by lens holder 4. Lens 5 is situated on the end of lens holder 4 opposite the camera sensor. Lens holder 4 forms a housing part of camera device 2. The camera chip is situated on a rear wall 6 of the housing of camera device 2, rear wall 6 being capable of being screwed onto a body part of a vehicle. For this purpose, housing 7 of camera device 2 has two lateral openings 8 (only one of which is visible here) that are provided on different sides of lens holder 4 and through which screws can be guided for fastening housing 7 to the body parts.

Figure 3:
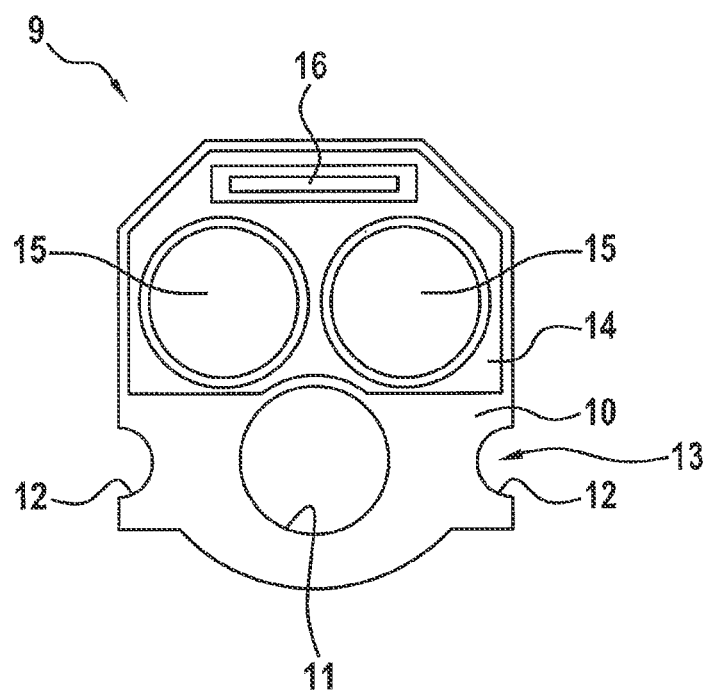
FIG. 3 shows a plug-on module of the monitoring system in a top view.

In addition, a plug-on module 9 is fastened on camera device 2. FIG. 3 shows plug-on module 9 in a simplified top view. Plug-on module 9 has a plate-shaped bearer 10 that is provided with a circular opening 11. Opening 11 has a diameter that corresponds substantially to the outer diameter of cylindrical lens holder 4, so that plug-on module 9 can be plugged onto lens holder 4 up to housing 7, by introducing lens holder 4 into opening 11.

At both sides of opening 11, the bearer has lateral openings 12 that correspond to openings 8 of housing 7 in their form and configuration relative to opening 11, and thus relative to lens holder 4. In this way, bearer 10 can be fastened on housing 7 by the screws that hold housing 7 on the body part. In addition, openings 12 form means 13 that define an orientation of plate-shaped bearer 10 relative to camera device 2, and thus form a rotational securing.

Moreover, on bearer 10 there is situated a circuit board 14 on which two infrared radiators 15 are situated, and which is electrically connected to a connecting plug 16 via electrical lines of circuit board 14. Alternatively, bearer 10 itself is fashioned as circuit board 14. In the top view of FIG. 3, infrared radiators 15 are configured alongside one another above opening 11. Connecting plug 16 is provided on the side of opening 11 situated opposite infrared radiators 15.

When, as shown in FIG. 1, plug-on module 9 is plugged onto lens holder 4, then infrared radiators 15 are situated adjacent to camera device 2, in particular to lens holder 4. In this way, the distance of infrared radiators 15 from the optical axis of camera device 2 is particularly small, so that recognition of the driver's direction of view, to be monitored by driver monitoring system 1, can be carried out with high precision. The infrared radiators are in particular infrared light-emitting diodes. Through a connecting plug 16, plug-on module can easily be effectively connected to camera device 2, so that in particular infrared radiators 15 can be controlled by camera device 2. On the rear side, facing away from infrared radiators 15, of bearer 10 a cooling element 17 is provided on bearer 10, for example as a copper pad. In this way, a good thermal cooling of circuit board 14, and in particular of infrared radiators 15, is ensured. Cooling element 11 can in particular be brought into physical contact with a further cooling element at the vehicle body, or can be screwed onto this cooling element, or connected thereto by an adhesive film, in order to ensure the best possible conducting away of heat.

Alternatively to the exemplary embodiment shown here, it is also conceivable to realize a plug-on module having only one infrared radiator 15, or having more than two infrared radiators 15. Usefully, driver monitoring system 1 has a plurality of plug-on modules that are differently realized with regard to the number and configuration of the lighting means, or infrared radiators 15, of which one can be selected for mounting or fastening on camera device 2. If necessary, an adapter ring can be provided between bearer 10 and lens holder 4 or housing 7, in order to compensate slight differences in diameter or differences in height.

In the present exemplary embodiment, openings 12 and 11 are at a height such that bearer 10 can also be plugged onto lens holder 4, and fastened on camera device 2, so as to be rotated by 180°. In this way, for example an optimized electrical connection can be enabled between plug-on module 9 and camera device 2.

In order to avoid mechanical deformation/expansion caused by temperature, it is moreover preferably provided that bearer 10 is made of the same material as lens holder 4.

Connecting plug 16 can for example be connected to camera device 2 by a ribbon cable or the like. It is also conceivable to provide connecting plug 16 on the side of cooling element 17, and to provide camera device 2 with a corresponding connecting plug that can be connected thereto, so that the two plug connectors are automatically brought together with the specified orientation to one another when bearer 10 is plugged onto lens holder 4, and are thereby connected to one another. Moreover, bearer 10 and lens holder 4 can be provided with interacting guide elements as further or alternative means 13 that ensure a desired orientation and rotational securing. Thus, for example lens holder 4 can have a groove extending axially along lens holder 4, and bearer 10 can have a guide pin that can be introduced into the groove and that protrudes into opening 11.

What is claimed is:

1. A monitoring system for a motor vehicle, comprising:
   at least one camera device which includes a cylindrical lens holder having at least one lens;
   at least one lighting element, which includes an infrared radiator;
   at least one plug-on module, which includes a plate-shaped bearer on which the at least one lighting element is situated; and
   at least one cooling element situated on the bearer, so as to cool the at least one lighting element, which includes the infrared radiator;
   wherein the at least one plug-on module is pluggable onto the lens holder,
   wherein the infrared radiator is situated on the bearer, wherein the bearer is configured as a circuit board or on which the circuit board is situated, and which is electrically connected to a connecting plug via electrical lines of the circuit board,
   wherein the infrared radiator includes at least two infrared radiators configured alongside one another above an opening in the bearer, wherein the connecting plug is provided on a side of the opening situated opposite the infrared radiators, and
   wherein when the plug-on module is plugged onto the lens holder, the infrared radiators are situated adjacent to the camera device and/or the lens holder, so that a distance of the infrared radiators from an optical axis of the camera device is such that recognition of a driver's direction of view, to be monitored by a driver monitoring system, can be performed.

2. The monitoring system as recited in claim 1, wherein the bearer has at least one opening for accepting the lens holder.

3. The monitoring system as recited in claim 2, wherein the at least one opening has a cross-section corresponding in form to the cross-section of the lens holder, so that the at least one plug-on module is pluggable onto the lens holder.

4. The monitoring system as recited in claim 2, wherein the lens holder has a jacket outer surface which is conical at least in selected segments.

5. The monitoring system as recited in claim 2, wherein the at least one lens holder and the bearer has an element for orienting the bearer relative to the lens holder.

6. The monitoring system as recited in claim 5, wherein the element has at least one guide groove and a guide pin configured to be brought into effective connection with the guide groove.

7. A plug-on module for a monitoring system of a motor vehicle, the monitoring system having at least one camera device including a cylindrical lens holder having at least one lens, comprising:
   a plate-shaped bearer on which is situated at least one lighting element, which includes an infrared radiator; and
   at least one cooling element situated on the bearer, so as to cool the at least one lighting element, which includes the infrared radiator;
   wherein the plate-shaped bearer is pluggable onto the lens holder,
   wherein the infrared radiator is situated on the bearer, wherein the bearer is configured as a circuit board or on which the circuit board is situated, and which is electrically connected to a connecting plug via electrical lines of the circuit board,
   wherein the infrared radiator includes at least two infrared radiators configured alongside one another above an opening in the bearer, wherein the connecting plug is provided on a side of the opening situated opposite the infrared radiators, and
   wherein when the plug-on module is plugged onto the lens holder, the infrared radiators are situated adjacent to the camera device and/or the lens holder, so that a distance of the infrared radiators from an optical axis of the camera device is such that recognition of a driver's direction of view, to be monitored by a driver monitoring system, can be performed.

8. The plug-on module as recited in claim 7, wherein the at least one opening has a cross-section corresponding in form to the cross-section of the lens holder, so that the at least one plug-on module is pluggable onto the lens holder.

9. The plug-on module as recited in claim 7, wherein the lens holder has a jacket outer surface which is conical at least in selected segments.

10. The plug-on module as recited in claim 7, wherein the at least one lens holder and the bearer has an element for orienting the bearer relative to the lens holder.

11. The plug-on module as recited in claim 7, wherein the element has at least one guide groove and a guide pin configured to be brought into effective connection with the guide groove.

12. The plug-on module as recited in claim 7, wherein a camera chip is situated on a rear wall of the housing of the at least one camera device, and wherein the plate-shaped bearer has at least one opening to accept the lens holder.

13. The plug-on module as recited in claim 7, wherein the lens holder forms a housing part of the at least one camera device, wherein the housing of the at least one camera device has lateral openings provided on different sides of the lens holder, and wherein the lateral openings form an arrangement that defines an orientation of the plate-shaped bearer relative to the at least one camera device, so as to provide a rotational securing.

14. The monitoring system as recited in claim 1, wherein a camera chip is situated on a rear wall of the housing of the at least one camera device, and wherein the plate-shaped bearer has at least one opening to accept the lens holder.

15. The monitoring system as recited in claim 1, wherein the lens holder forms a housing part of the at least one camera device, wherein the housing of the at least one camera device has lateral openings provided on different sides of the lens holder, and wherein the lateral openings form an arrangement that defines an orientation of the plate-shaped bearer relative to the at least one camera device, so as to provide a rotational securing.

* * * * *